United States Patent [19]
King et al.

[11] Patent Number: 6,035,884
[45] Date of Patent: Mar. 14, 2000

[54] LIQUID FUEL BAFFLE FOR VENT APPARATUS

[75] Inventors: Timothy J. King, Connersville, Ind.; Barry Chestnut, Jenison, Mich.; Lowell R. Bell, Connersville, Ind.

[73] Assignee: Stant Manufacturing Inc., Connersville, Ind.

[21] Appl. No.: 09/154,565

[22] Filed: Sep. 16, 1998

Related U.S. Application Data

[60] Provisional application No. 60/058,965, Sep. 16, 1997.

[51] Int. Cl.[7] .................................................. F16K 24/04
[52] U.S. Cl. .............................................. 137/202; 137/43
[58] Field of Search ........................................ 137/43, 202

[56] References Cited

U.S. PATENT DOCUMENTS

| | | | |
|---|---|---|---|
| 3,610,263 | 10/1971 | Walters | 137/43 |
| 4,655,238 | 4/1987 | Szlaga . | |
| 4,679,581 | 7/1987 | Mears | 137/202 X |
| 4,905,726 | 3/1990 | Kasugai et al. . | |
| 4,991,615 | 2/1991 | Szlaga et al. | 137/202 X |
| 5,028,244 | 7/1991 | Szlaga . | |
| 5,065,782 | 11/1991 | Szlaga | 137/202 X |
| 5,215,132 | 6/1993 | Kobayashi . | |
| 5,234,013 | 8/1993 | Roetker et al. . | |
| 5,449,029 | 9/1995 | Harris . | |
| 5,535,772 | 7/1996 | Roetker et al. . | |
| 5,566,705 | 10/1996 | Harris . | |
| 5,577,526 | 11/1996 | Kasugai et al. . | |
| 5,590,697 | 1/1997 | Benjey et al. . | |
| 5,598,870 | 2/1997 | Nagino | 137/202 X |
| 5,694,968 | 12/1997 | Devall et al. . | |
| 5,944,044 | 8/1999 | King et al. | 137/202 |

Primary Examiner—Gerald A. Michalsky
Attorney, Agent, or Firm—Barnes & Thornburg

[57] ABSTRACT

An apparatus is provided that includes a valve container with a vapor inlet adapted for communicating with an interior region of the fuel tank and a vapor outlet, a baffle including an upper end coupled to the vapor inlet, an open lower end spaced-apart from the upper end, and a skirt extending between the upper and lower ends, and a float valve disposed in the valve container and movable between an opened position allowing flow of fuel vapor through the vapor outlet and a closed position preventing flow of fuel vapor through the vapor outlet. The skirt of the baffle includes at least one slot therethrough and the float valve is positioned to lie between the vapor inlet and the slot of the baffle when in both the opened and closed positions.

24 Claims, 9 Drawing Sheets

LIQUID FUEL BAFFLE FOR VENT APPARATUS

This claims priority under 35 U.S.C. §119(e) of Serial No. 60/058,965 filed Sep. 16, 1997.

BACKGROUND AND SUMMARY OF THE INVENTION

The present invention relates to a liquid fuel baffle for a vent apparatus, and particularly to a liquid fuel baffle that operates to slow the flow of liquid fuel into a vent apparatus mounted in a fuel tank. More particularly, the present invention relates to a liquid fuel baffle that routes the flow of liquid fuel away from a vent apparatus mounted in a fuel tank to inhibit premature movement of the vent apparatus to a closed position.

Tank-ventilation control assemblies that selectively discharge fuel vapor pressure in response to the development of high tank pressure conditions and admit air into the fuel tank in response to the development of vacuum conditions therein are known. See for example, U.S. Pat. No. 5,234,013 to Roetker et al.

According to the present invention, a liquid fuel baffle is coupled to a vent apparatus mounted in a fuel tank. The liquid fuel baffle extends from the vent apparatus toward a bottom wall of the fuel tank to influence the flow of liquid fuel within the fuel tank during sloshing conditions, such as that caused by sudden movement of the vehicle, for example, rapid acceleration, hard braking or sharp cornering. The baffle routes the flow of liquid fuel away from vent apparatus and therefore inhibits premature movement of a valve housed in the vent apparatus to a closed position.

In preferred embodiments, the baffle includes a skirt extending downwardly from the vent apparatus and having a skirt outlet coupled to the vent apparatus, a skirt inlet spaced therefrom in fluid communication with the fuel tank and a skirt defining a passageway extending between the skirt outlet and the skirt inlet. The skirt is formed to include at least one slot therethrough. The slot extends substantially along the length of the skirt from the skirt outlet toward the skirt inlet.

Additional features of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

2

DETAILED DESCRIPTION OF THE DRAWINGS

Figure 1:
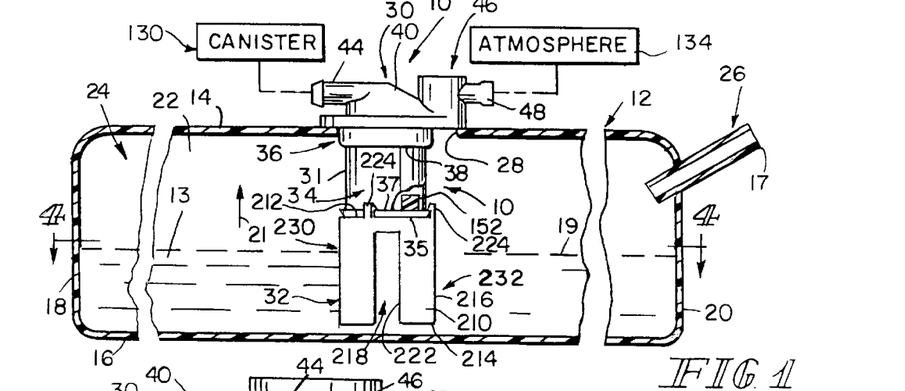
FIG. 1 is a diagrammatic view of liquid fuel baffle in accordance with the present invention coupled to a vent apparatus that includes a lid and a valve container coupled to the lid and extending through an aperture in the fuel tank, the baffle including a skirt formed to include vertical slots and flanges appended to the skirt and coupled to the valve container.

Referring to FIG. 1, a liquid fuel baffle 32 is coupled to a vent apparatus 10 mounted in an aperture 28 formed in a top wall 14 of elongated vehicle fuel tank 12 containing liquid fuel 13. Vent apparatus 10 includes a lid 30 and an elongated valve container 34 extending into an interior region 24 of fuel tank 12. Baffle 32 includes a skirt 210 extending toward a bottom wall 16 of fuel tank 12 and flanges 224 appended to skirt 120 and snap-fit onto valve container 34. When liquid fuel 13 sloshes in fuel tank 12 between opposite ends 18, 20, skirt 210 routes the flow of liquid fuel 13 around the baffle 32 away from valve container 34. Thus, baffle 32 slows the flow of liquid fuel 13 into valve container 34 giving vent apparatus 10 time to react liquid fuel 13 in fuel tank 12 in order to close itself when necessary and prevent premature closure.

As shown in FIG. 1, fuel tank 12 includes side walls 22, 23 extending between top, bottom, and end walls 14, 16, 18, 20 to define interior region 24 and a filler neck 26. End walls 18, 20 of fuel tank 12 are positioned to face a front end and a back end of a vehicle (not shown) and are spaced-apart from one another by a predetermined distance of about four feet. Such elongated fuel tanks 12 are found in sport-utility vehicles, truck, or the like. Filler neck 26 extends through side wall 23 and has a mouth 17 for receiving a fuel-dispense pump nozzle (not shown) during refueling. As fuel tank 12 is filled during refueling, a top surface 19 of liquid fuel 13 will rise in direction 21 as shown in FIG. 1. Normally, a removable cap (not shown) is used to close mouth 17 of filler neck 26.

As shown in FIG. 1, valve container 34 of vent apparatus 10 includes a generally cylindrical sleeve 31 defining an inlet 35 in communication with fuel tank 12. Inlet 35 has an annular lower rim 37 thereon and an upper flange 36 forming an annular upper rim 38. Vent apparatus 10 can discharge pressurized fuel vapor to a vapor-recovery canister 130 through a first output tube 44 and to an atmosphere 134 through a second output tube 46. Canister 130 is a charcoal-filled canister designed to capture and store fuel vapors that are generated and displaced in fuel tank 12 during a vehicle-refueling operation. Vent apparatus 10 also quickly blocks unwanted spillage of liquid fuel 13 from fuel tank 12 when liquid fuel 13 is agitated during operation of the vehicle. Details regarding the internal components of vent apparatus 10 will be discussed later, with reference to FIG. 5.

Figures 2, 3, 4:
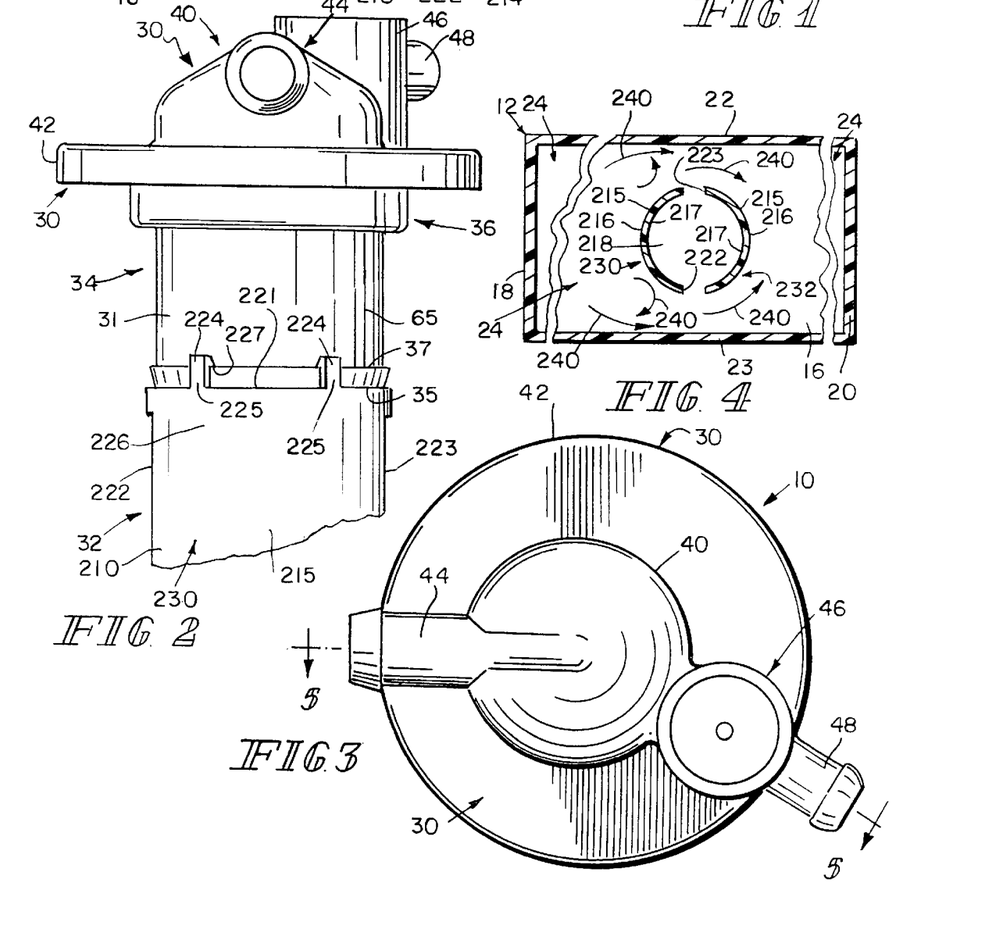
FIG. 2 is a side elevation view of baffle and vent apparatus of FIG. 1, the valve container including a sleeve having annular lower rim and showing two of the flanges appended to the skirt engaging the lower rim, each flange including a finger and a tab.
FIG. 3 is a top plan view of the vent apparatus of FIGS. 1–2, showing the lid having a closure shell, a first output tube, and a pressure-relief module coupled to a second output tube.
FIG. 4 is a view taken along lines 4—4 of FIG. 1 showing the relative positioning of the slots in the skirt and the opposite side walls of the fuel tank, the opposite exterior surfaces and the end walls of the fuel tank, and the exterior surfaces of the baffle routing the flow of liquid fuel about the baffle.
Figure 5:
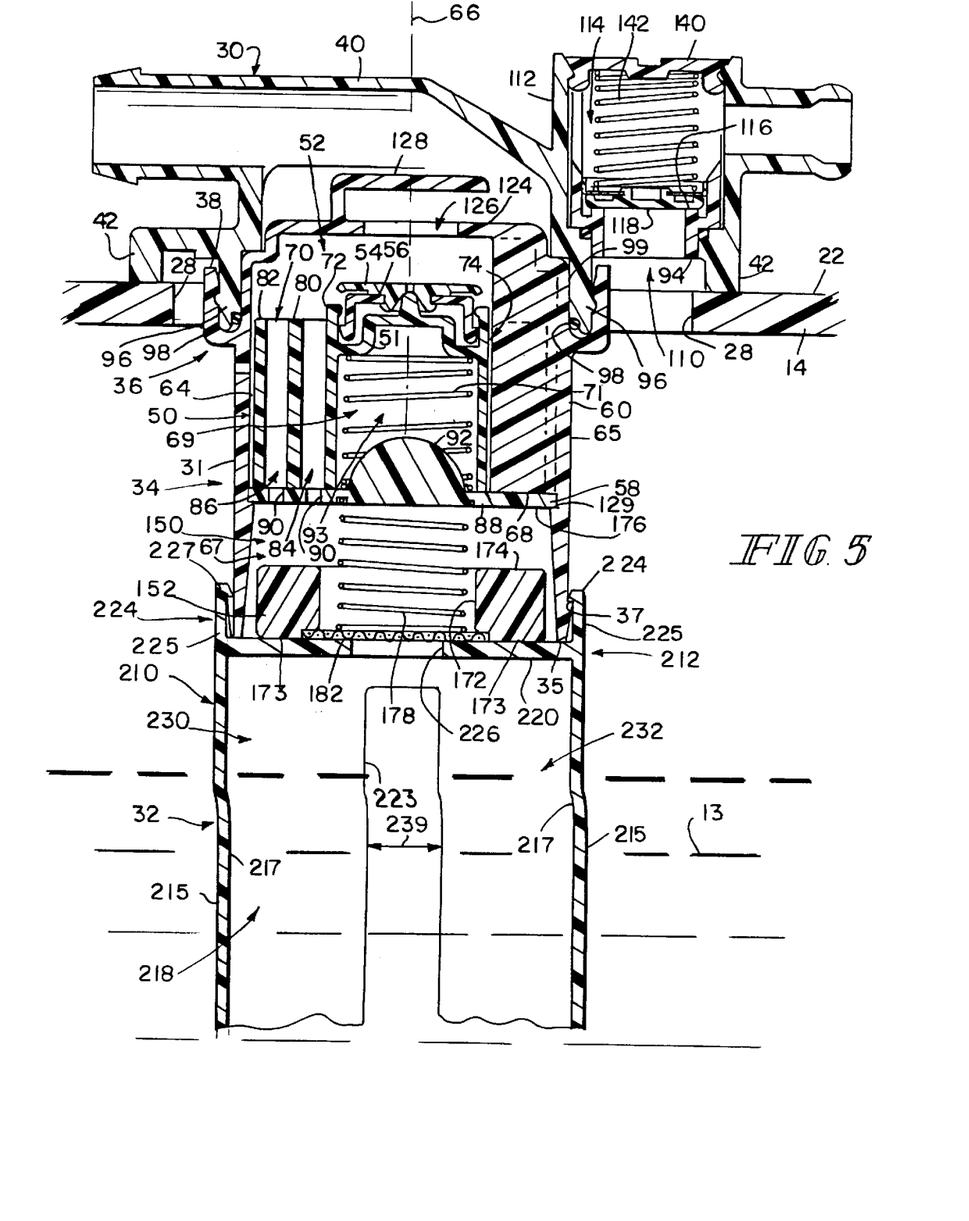
FIG. 5 is an enlarged transverse sectional view of the baffle and vent valve of FIG. 1 taken along lines 5—5 of FIG. 3 mounted in the top wall of the fuel tank showing the baffle including a seat and the valve container including an outlet and a base spaced-apart from the outlet, the base defining an upper chamber housing a float member and a lower chamber adjacent to the lower rim of the sleeve and housing a float valve.
Figure 6:
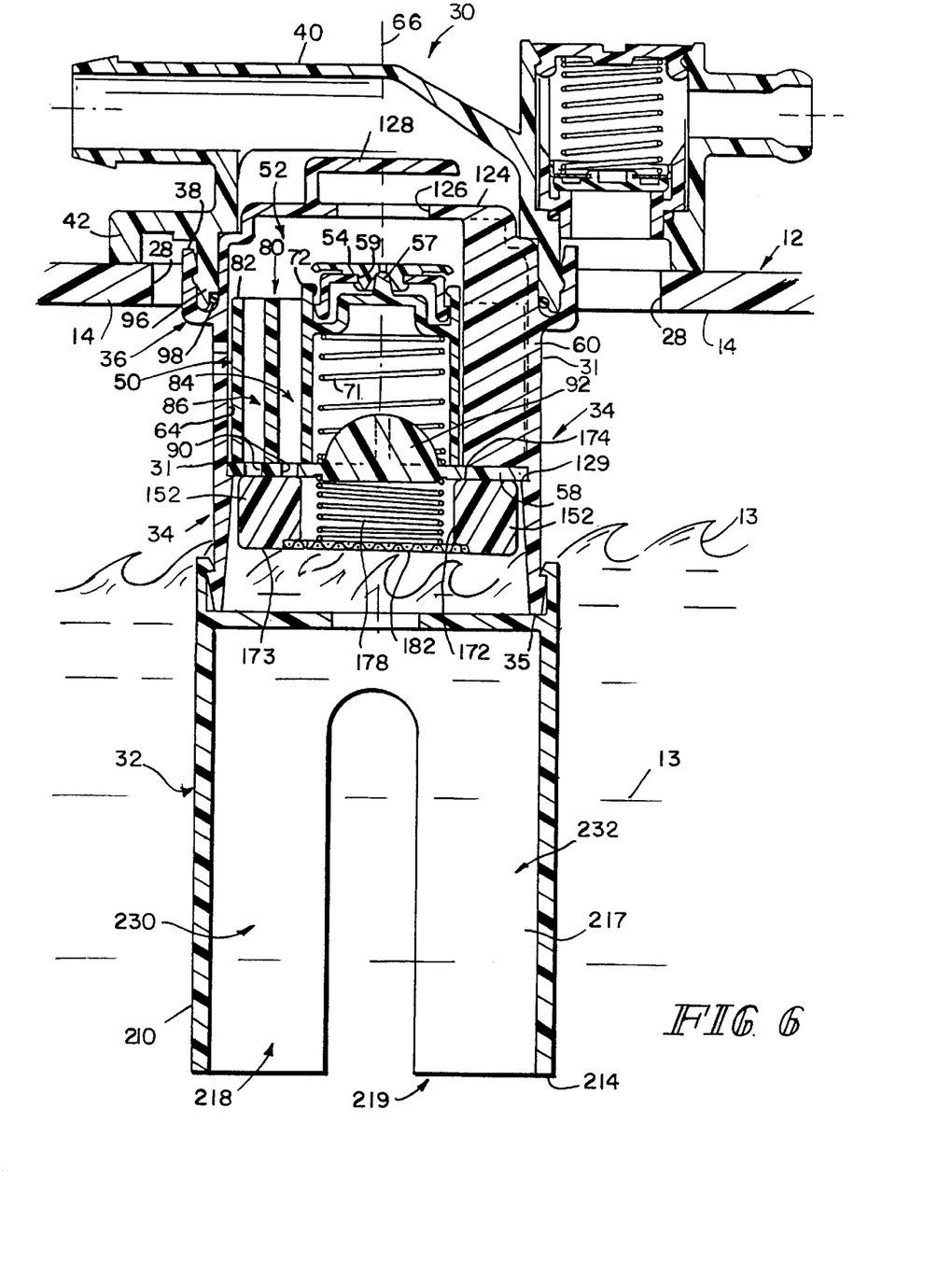
FIG. 6 is a view similar to FIG. 5 showing upward movement of the float valve in the lower chamber of the valve container to a closed position during fuel sloshing or the like when fuel travels through the baffle and engages the float valve, blocking the flow of liquid fuel and fuel vapor into flow passages of the float member through slots formed in the base to close the outlet in the valve container and prevent liquid fuel from escaping through the vent valve.

Baffle 32 is formed to fit over inlet 35 of valve container 34. As shown in FIGS. 1–2, skirt 210 of baffle 32 includes an upper end 212, a lower end 214 and a side wall 216. As best shown in FIG. 4, side wall 216 includes opposite halves 230, 232 that each include a generally convex exterior surface 215 and a generally concave interior surface 217. Interior surfaces 217 define a passageway 218 extending between upper and lower ends 212, 214. Referring now to FIG. 6, skirt 210 of baffle 32 is formed to include an opening 219 into passageway 218 at open lower end 214. Opening 219 extends between interior surfaces 217. As shown in FIG. 5, a seat 220 is coupled to interior surface 64 and extends across passageway 218 at upper end 212 of skirt 210. Seat 220 is formed to include an aperture 222 therethrough in general alignment with screen 182. In addition, flexible flanges 224 extend from seat 220 for engagement with lower annular rim 37 of inlet 35. Each flange 224 includes a finger 225 and a tab 227 extending from finger 225 for engagement with rim 37.

Side wall 216 of skirt 210 is formed to include a pair of slots 222, 223 that divide side wall 216 into opposite halves 230, 232. Slots 222, 223 extend between exterior and interior surfaces 215, 217 from lower end 214 of skirt 210 toward seat 220. Referring again to FIG. 4, slots 222, 223 are positioned to lie in general alignment with one another and are in alignment with side walls 22, 23 of fuel tank 12. Thus, exterior surface 215 of opposite halves 230, 232 face opposite ends 18, 20 of fuel tank 12. Slots 222 each have a pre-determined width 239, as shown in FIG. 5, of about 0.75 inches to about one inch. The diameter of side wall 216 is determined by the diameter of valve container 34. The length of slots 222 is determined by the length of skirt 210 and the length of skirt 210 is, in turn, determined by the predetermined distance between walls 14, 16 of fuel tank 12. Slots 222, 223 in baffle 32 eliminate the effect of the downwardly extending skirt 210 on the predetermined fuel fill level within fuel tank 12. The predetermined fuel fill level is the level to which liquid fuel 13 may be filled within fuel tank 12 before shutting off the pump nozzle (not shown).

In operation, during sloshing conditions, such as that caused by sudden movement of the vehicle, for example, rapid acceleration, hard braking or sharp cornering, liquid fuel 13 flows between opposite ends 18, 20 of fuel tank 12. As liquid fuel 13 flows, it impinges exterior surfaces 215 of skirt halves 230, 232. The convex shape of exterior surfaces 215 routes the flow of liquid fuel 13 in fuel tank 12 around skirt 210, as shown by arrow 240 in FIG. 4. Thus, liquid fuel 13 is blocked by baffle 32 from immediately engaging vent apparatus 10. Thus, baffle 32 slows the flow of liquid fuel 13 through passageway 218 giving vent apparatus 10 time to react liquid fuel 13 in fuel tank 12 in order to close itself when necessary and preventing premature closure of vent apparatus 10.

As shown, for example, in FIG. 5, valve container 34 includes a top wall 124 coupled to annular inner wall 99 of sleeve 31 and formed to include an outlet 126 and a shield 128 overlying outlet 126. Shield 128 is integrally appended to top wall 124. Sleeve 31 of valve container 34 includes an inner surface 64 and an opposite outer surface 65. Inner surface 64 defines passageway 67 extending between inlet 35 and outlet 126. Inner surface 64 further includes an annular lip 129 extending into passageway 67 that supports a base 58.

Base 58 is cooperates with inner surface 64 to define an upper chamber 52 and a lower chamber 150. Base 58 includes a circular plate 88 with, for example, three annular slots 90 arranged to lie near and extend around the perimeter edge of circular plate 88. Base 58 also includes a hemispherical-shaped protrusion 92 sized to extend into upper chamber 53.

Axially extending, sheet-like guide ribs 60 are positioned to lie in upper chamber 52 so that one edge of each guide rib 60 is anchored to inner surface 64 of cylindrical sleeve 31 and each guide rib 60 extends in a radial direction from inner surface 64 toward a central axis 66 extending axially through valve container 34. Each guide rib 60 includes a lower edge 68 for engaging base 58 and is integrally appended to cylindrical sleeve 31.

More details of vent apparatus 10 are shown in FIG. 5. Vent apparatus 10 further includes a float member 50 sized to fit into and move up and down in upper chamber 52 formed in valve container 34, an upper closure member 54, a frame 56 configured to support upper closure member 54 and connect to float member 50 to allow for some limited axial movement of float member 50 relative to upper closure member 54. Base 58 lies in a float member-support position underneath the movable float member 50.

Float member 50 includes wing segments 70 appended to a central tube or post 72. As shown in FIG. 5, central tube 72 includes an open mouth 93 defining an axially extending chamber 69 sized to receive a compression spring 71 therein. Spring 71 applies an upwardly directed force to float member 50 by acting against dome 51 and base 58 to assist in lifting float member 50 whenever float member 50 is exposed to rising levels of liquid fuel 13. Open mouth 93 sized to receive protrusion 92 of base therein. In addition, a radially extending space or slot 74 is formed to lie between each pair of adjacent to wing segments 70 to receive one guide rib 60.

Each wing segment 70 illustratively includes interior annular walls 80, 82. As shown in FIG. 5, walls 80, 82 are arranged to define first and second axially extending flow passages 84, 86 through each wing segment 70. The transverse cross-sectional shape (e.g. arcuate, narrow width, long arc length) of flow passages 84, 86 is sized so that liquid fuel 13 reaching the entrance to these flow passages 84, 86 will tend to agglomerate in the passage entrances momentarily to block flow of liquid fuel 13 through the flow passages 84, 86 owing, at least in part, to surface tension and/or viscosity of the liquid fuel 13, thereby momentarily increasing the effective surface area of the bottom of the float member 50. Liquid fuel 13 agglomerating in the passage entrances along with adjacent to lower edges of walls 80, 82 included in float member 50 function to define (for at least a suitable short period of time) an effective "solid" bottom wall having a rather large effective surface area. This will cause float member 50 to move quickly to a vent outlet-closing position in the manner described below. For a further description of float member 50, see U.S. patent application Ser. No. 08/853,530, filed May 9, 1997, now U.S. Pat. No. 5,944,044, entitled "Tank Venting Control System", the specification of which is incorporated herein by reference.

Float valve 152 of vent apparatus 10 is positioned to lie inside lower chamber 150 of valve container 34 for movement therein. Float valve 152 is movable between an opened position shown in FIG. 5, allowing flow of pressurized flow vapor from fuel tank 12 into annular slots 90 formed in base 58 and through flow passages 84, 86 in float member 50, and a closed position shown in FIG. 6, blocking flow of pressurized fuel vapor from fuel tank 12 into flow passages 84, 86 through annular slots 90.

Base 58 and baffle 32 define a top and bottom boundaries of lower chamber 152 and movable float valve 152 is positioned therebetween. Slots 90 of base 158 place lower chamber 150 and flow passages 84, 86 in float member 50 in fluid communication. Float valve 152 includes a bottom wall 173 and a top wall 174 positioned to engage underside 176 of base 58 in chamber 152 to close each slot 90 formed in base 58 to block liquid fuel 13 flow therethrough in response to movement of float valve 152 to its closed position as shown, for example, in FIG. 6.

Movable float valve 152 is formed to include a central aperture 172 and a fine screen 182 coupled to bottom wall 173 extending across central aperture 172. Fine screen 182 includes apertures having a width of about 150 to about 500 microns. More preferably, fine screen 182 is constructed of about 150 micron square weave nylon. Float valve 152 has a density that is less than liquid fuel 13 and is preferably constructed of nitrophyl closed cell foam. A compression spring 178 rests upon screen 182 and extends through the central aperture 172 of float valve 152. A lower end of spring 178 engages screen 182 and an upper end of spring 178 engages underside 70 of base 158 as shown, for example, in FIG. 5.

Float valve 152 is held on a seat 220 of baffle 32 by spring 178. Screen 182 permits fuel vapor to pass therethrough. When however, liquid fuel 13 from slosh conditions hits screen 182, float valve 152 immediately moves toward base 158 to close slots 90 to prevent liquid carryover. When liquid fuel 13 retreats from lower chamber 150, spring 178 presses float valve 152 back toward seat 220. A further description of float valve 152 may be found in U.S. patent application Ser. No. 08/853,530, filed May 9, 1997, now U.S. Pat. No. 5,944,044, entitled "Tank Venting Control System", the specification of which is incorporated herein by reference.

Referring now to FIG. 5, container lid 30 includes a closure shell 40, an annular mounting flange 42 depending from closure shell 40, first output tube 44 coupled to closure shell 40, a pressure-relief module 46 coupled to closure shell 40, and second output tube 48 coupled to pressure-relief module 46 for venting fuel vapor to atmosphere 134. In addition, lid 30 includes a downwardly facing plate 94 lying inside annular flange 42. Lid 30 also includes an annular rim 96 configured to carry an O-ring seal 98 and sized to fit inside upper flange 36 on valve container 34 to trap O-ring seal 98 between container lid 30 and valve container 34. O-ring seal 98 is urged against an annular inner wall 99 included in container 34 in radially inwardly spaced-apart relation to annular upper flange 36.

Plate 94 in container lid 30 is formed to include an aperture 110 positioned to lie between annular rim 96 and annular flange 42, as shown in FIG. 5 to conduct fuel vapor in interior region 24 in fuel tank 12 into pressure-relief module 46. Pressure-relief module 46 includes a shell 112 defining a chamber 114 providing a flow passageway between aperture 110 and second output tube 48 and includes an annular valve seat 116 in chamber 114 and around aperture 110, a pressure-relief valve 118, a cap 140 for closing an open end of shell 112, and a spring 142. Spring 142 yieldably urges the pressure-relief valve 118 into sealing engagement with underlying annular valve seat 116 normally to block discharge of fuel vapor from interior region 24 from pressure-relief module 46 through second outlet tube 48.

As described above, baffle 32 slows the flow of liquid fuel through passageway 218 and into engagement with vent apparatus 10. As shown in FIG. 6, during sloshing conditions, liquid fuel 13 flows through passageway 218 of skirt 210 and into engagement with fine screen 182. This engagement raises float valve 152 in chamber 150 from an opened position (FIG. 5) allowing flow of pressurized fuel vapor from fuel tank 12 into slots 90 formed in base 58 through flow passages 84, 86 formed in float member 50 to closed position shown, for example, in FIG. 6.

In use, float valve 152 and float member 50 are each able to react quickly to rising levels of liquid fuel 13 in fuel tank 12 to move upwardly toward top wall 124 of valve container 34. As liquid fuel 13 enters aperture 222 in seat 220, liquid fuel 13 encounters fine screen 182. The openings through screen 182 are blocked momentarily owing to surface tension and/or viscosity of liquid fuel 13 agglomerating in the openings. This produces an effect similar to what would happen if float valve 152 had a "solid" bottom wall exposed to rising levels of liquid fuel 13. In the case of float valve 152, there is an apparent increase in displaced volume of liquid fuel 13 that leads to quicker initial closure of slots 90. In effect, using agglomerations of liquid fuel 13 to close momentarily the central aperture 172 formed in float valve 152 acts to temporarily "enlarge" the effective surface area of bottom wall 173 of float valve 152 so that more liquid fuel 152 can be displaced, causing float valve 152 to actuate snap against base 58.

Figure 7:
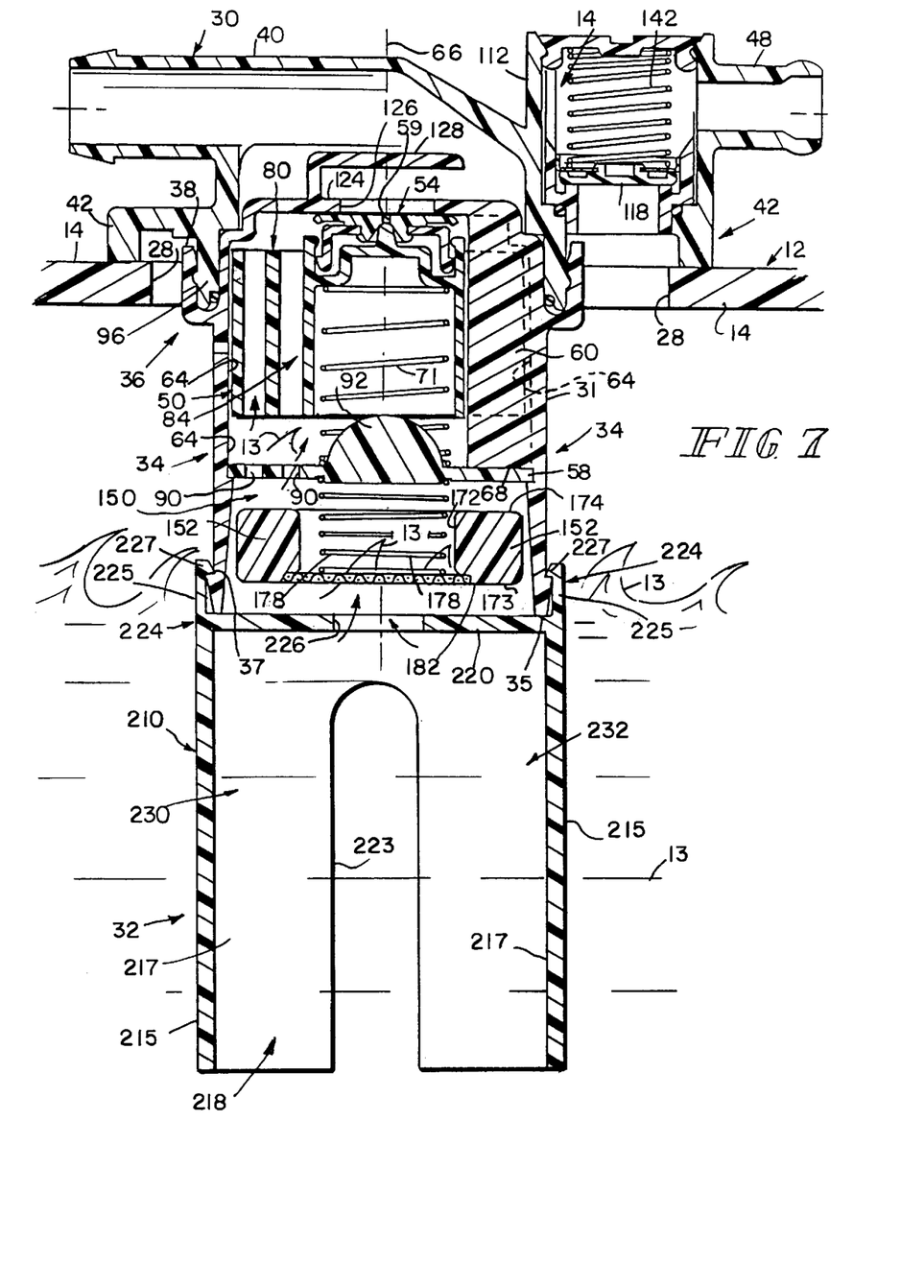
FIG. 7 is a view similar to FIG. 6 showing upward movement of the float member in the upper chamber of the valve container during severe fuel sloshing or the like when fuel travels through the baffle and the slots formed in the base faster than movement of the float valve to the closed position, the float member moving in the upper chamber to the closed position to close the outlet in the valve container and prevent liquid fuel from escaping through the vent valve.

In severe fuel sloshing conditions over rough terrain or during sharp turns, liquid fuel 13 may slosh through the baffle 32 and lower chamber 150 at a speed that is greater than the movement of the float valve 152, as shown in FIG. 7. In such instances, liquid fuel 13 will rise through slots 90 in base 158 and encounter first and second flow passages 84, 86 formed in wing segments 70 of float member 50. Flow passages 84, 86 are sized so that they are blocked momentarily owing to surface tension and/or viscosity of liquid fuel 13 agglomerating in passages 84, 86. Agglomerations of liquid fuel 13 temporality enlarges the surface area of float member 50 and snaps float member 50 to a closed position shown in FIG. 7.

Vent apparatus 10 is shown in its fully closed position in FIG. 7. At this stage, liquid fuel 13 in fuel tank 12 has raised float member 50 upwardly far enough so that upper closure member 54 engages top wall 124 to close outlet 126 formed in top wall 124. At the same time, nipple 57 appended to float member 50 is positioned to close opening 59 formed in upper closure member 54. Escape of liquid fuel 13 and fuel vapor from fuel tank 12 is blocked because a first fluid and vapor seal is established between top wall 124 and upper closure member 54 and a second fluid and vapor seal is established between upper closure member and nipple 57. As soon as the fuel sloshing subsides and the risk of liquid fuel carryover to the vapor-recovery canister 130 through outlet 126 is reduced, then float member 50 will sink under its own weight toward its rest position shown in FIG. 5.

Figure 8:
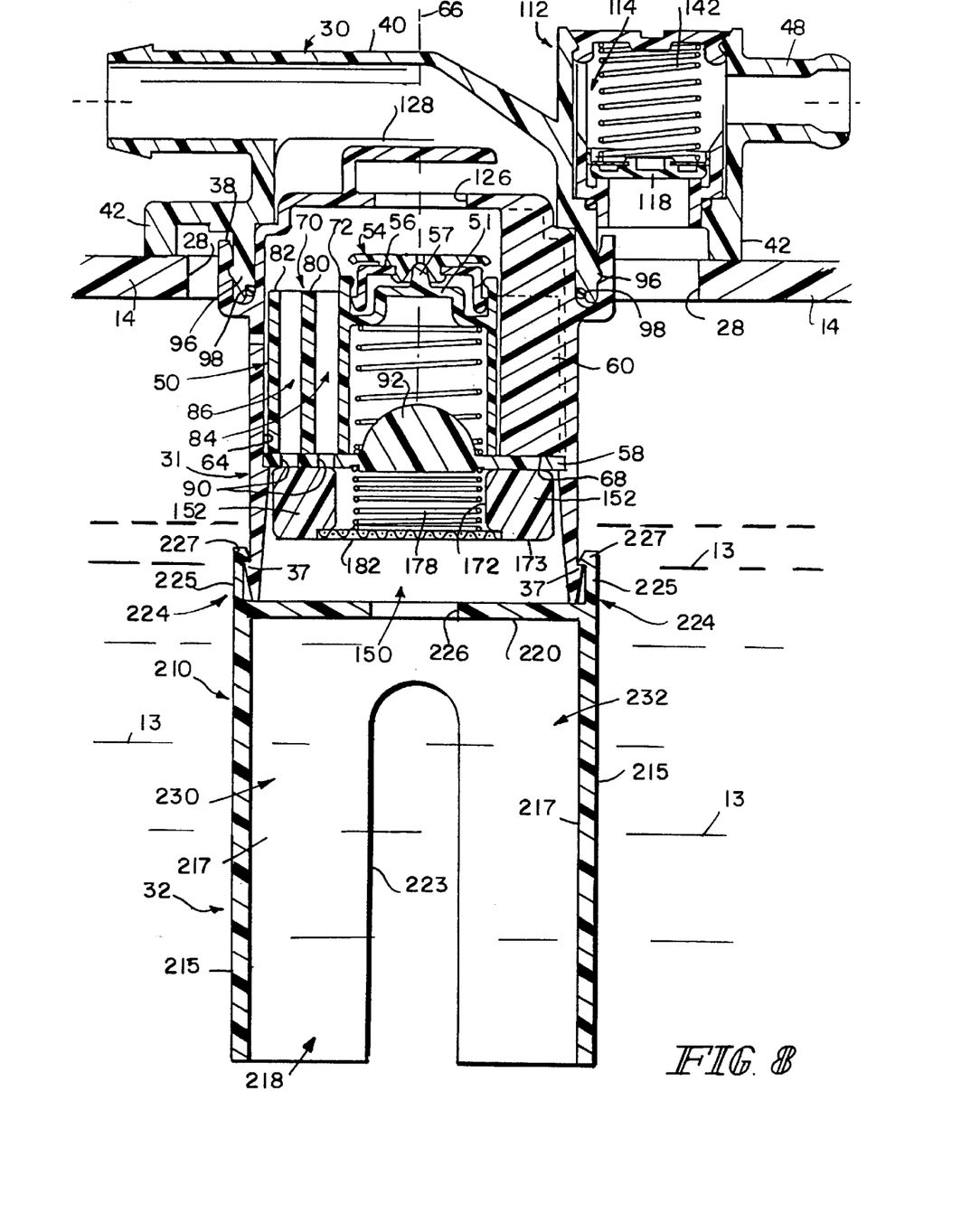
FIG. 8 is a view similar to FIG. 5 of the vent valve during refueling and showing the slots in the baffle eliminating the effect of the skirt on the pre-determined fuel fill level within the fuel tank and showing the addition of liquid fuel in the fuel tank by a pump operator causing the float valve to rise in the lower chamber of the valve container to a closed position, blocking the flow of liquid fuel and fuel vapor into flow passageway of the float member through slots formed in the base.
Figure 9:
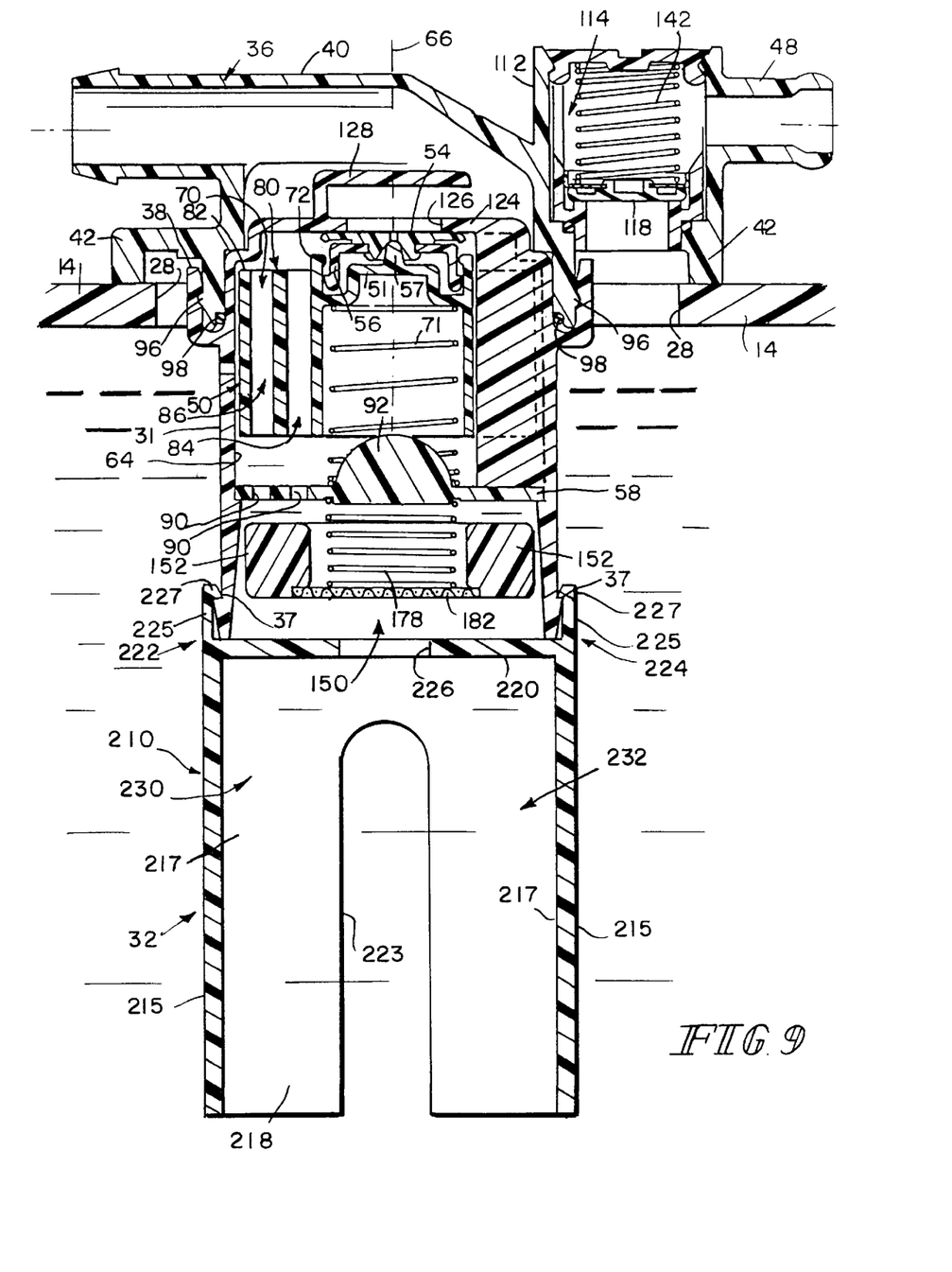
FIG. 9 is a view similar to FIG. 8 showing that if the pump operator continues to add more liquid fuel into the fuel tank using a trickle-fill technique, the level of liquid fuel in the flow passages of the float member will ultimately rise to a point high enough to apply a buoyancy force to the float member, thereby lifting it to a position closing the tank venting outlet in the valve container.

Operational stages of vent apparatus 10 during a typical fuel tank refueling sequence are shown in FIGS. 5, 8, and 9. Initially, level 19 of liquid fuel 13 in fuel tank 12 is rather low as shown in FIG. 5. At relatively low fuel vapor pressure levels in fuel tank 12, no venting through vent apparatus 10 is occurring and both float member 50 and float valve 152 are opened.

During refueling, top surface 19 of liquid fuel 13 rises and once level 19 of liquid fuel 13 in fuel tank 12 has risen to a pre-determined level as shown in FIG. 8, float valve 152 in lower chamber 150 moves to its closed position. This arrests aspiration of displaced fuel vapor in fuel tank 12 and blocks gross passage of liquid fuel 13 into slots 90 in base 58.

At this stage, if a pump operator continues to add more and more liquid fuel 13 into filler neck 26 using the trickle-fill technique, level 19 of liquid fuel 13 will ultimately rise to a point where it flows around float valve 152 and through slots 90 in base 58 as shown in FIG. 9. Eventually, level 19 of liquid fuel 13 will rise to a level that is high enough to apply a buoyancy force to float member 50 to raise float member 50 to its closed position. This point is reached after a pre-selected successive overfill (i.e., trickle-fill) attempts by a pump operator. That is after a pump operator clicks or squeezes the lever handle on the pump nozzle (not shown) slowly after the first automatic nozzle shut-off has occurred. Once float member 50 is moved to its closed position as shown in FIG. 9, fuel vapor no longer passes from fuel tank 12 to vapor-recovery canister 130. At this stage, no more liquid fuel 13 can be added to fuel tank 12.

Figure 10:
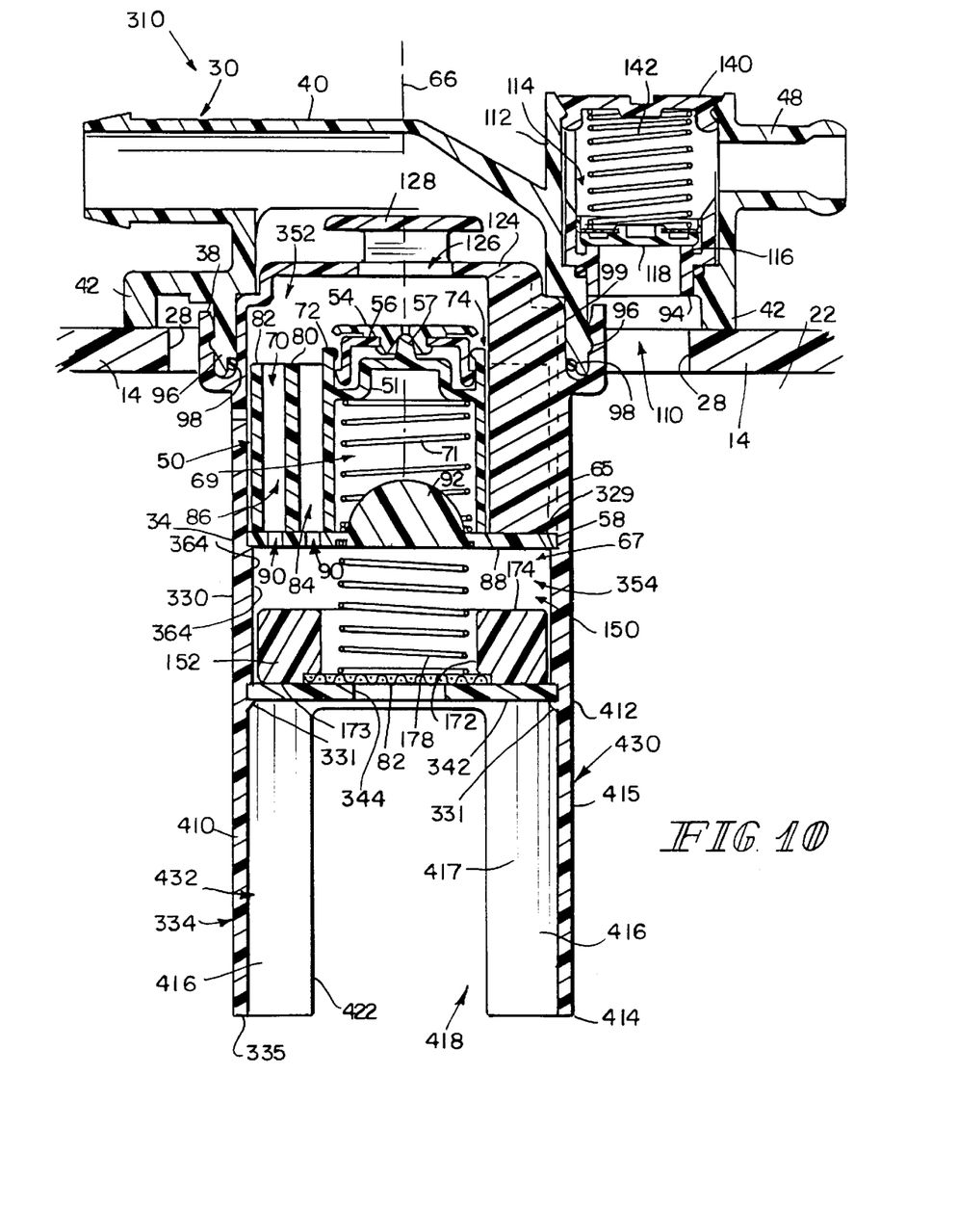
FIG. 10 a sectional elevation view of a vent valve mounted to the top wall of the fuel tank showing the vent valve including a lid positioned outside the fuel tank, a valve container coupled to the lid and extending through an aperture in the fuel tank, a float member, and a float valve, the valve container including a sleeve defining an upper chamber housing the float member, a lower chamber housing the float valve, and a baffle integrally formed with the sleeve and extending away from the lower chamber.

A vent apparatus 310 in accordance with the present invention is mounted in elongated fuel tank 12 in a manner similar to vent apparatus 10. As shown in FIG. 10, vent apparatus 310 is formed in a manner similar to vent apparatus 10, and like reference numerals are used to denote like components. Vent apparatus 310 includes a sleeve 330 including an inlet 335, outlet 126, and an inner surface 364 extending between inlet 335 and outlet 126. Inner surface 364 includes an upper lip 329 extending into passageway 67 that supports base 58 and a lower lip 331 extending into passageway 67 to support a floor 342. Floor 342 includes an aperture 344 therethrough in general alignment with screen 182 of float valve 152. In addition, inner surface defines an upper chamber 352 between base 58 and outlet 126 and a lower chamber 354 between base 58 and floor 342. Float member 50 is positioned to lie within upper chamber 352 and float valve 152 is positioned to lie within lower chamber.

As shown in FIG. 10, a baffle 334 is formed integrally with sleeve 330 and extends from lower chamber 254. Baffle 334 includes a skirt 410 having an upper end 412 integrally formed with sleeve 330 adjacent to floor 342, a lower end 414, and a side wall 416. Side wall 416 includes an exterior surface 415 and an interior surface 417. Interior surface 417 defines a passageway 418 extending between upper and lower ends 412, 414. Side wall 416 of skirt 410 is formed to include a pair of slots 422 that divide side wall 416 into opposite halves 430, 432. Slots 422 are positioned to lie in general alignment with one another and are in alignment with side walls 22, 23 of fuel tank 12, in a manner similar to slots 222, 223 as shown in FIGS. 1 and 4. Slots 422 in baffle 432 also eliminate the effect of the downwardly extending skirt 410 on the predetermined fuel fill level within fuel tank 12. Vent apparatus 310 operates similarly to vent apparatus 10 described above.

Figure 11:
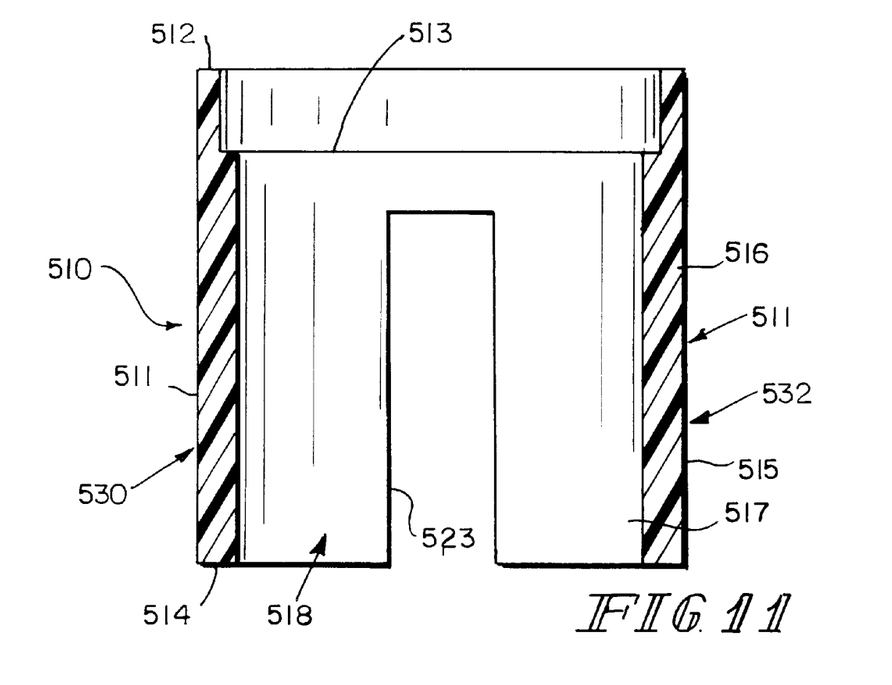
FIG. 11 is a cross-sectional view of an alternative embodiment of a liquid fuel baffle for a vent apparatus in accordance with the present invention showing the baffle including a skirt defining a passageway, a seat extending into the passageway, and a slot extending through the skirt.
Figure 12:
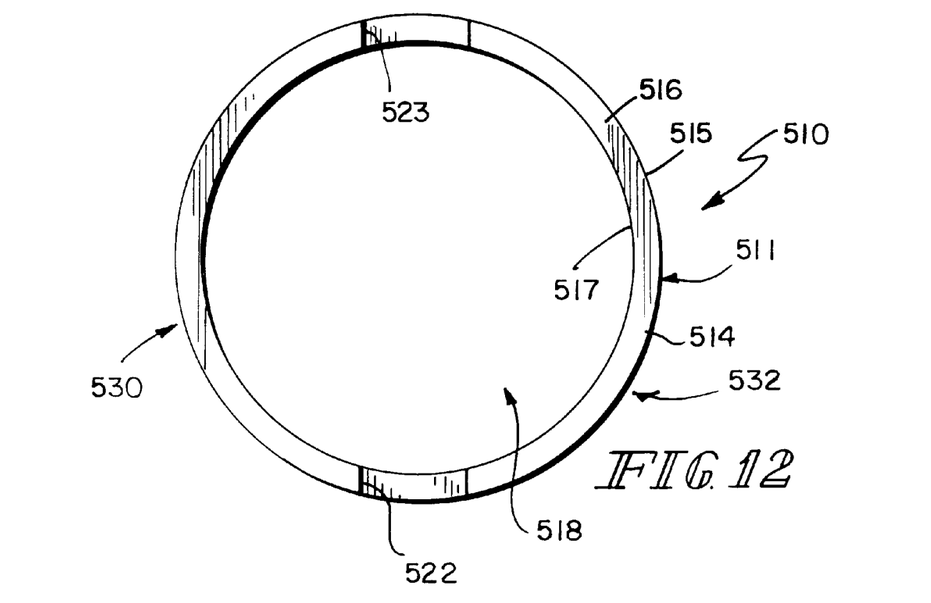
FIG. 12 is a bottom view of the baffle of FIG. 11 showing two slots formed in the skirt, the slots being positioned to lie in general alignment with one another.

In yet another embodiment of the present invention, a baffle 510 is shown in FIGS. 11 and 12. Baffle 510 is formed to snap-fit on valve container 34, as shown in FIG. 5. Baffle 510 is formed similarly to baffle 34 and like reference numerals will be used to denote like components. Baffle 510 includes a skirt 511 having an upper end 512 formed to snap-fit on inlet 35 of housing 34, a lower end 514, and a side wall 516. As best shown in FIG. 12, side wall 516 includes an exterior surface 515 and an interior surface 517. Interior surface 517 defines a passageway 518 extending between upper and lower ends 512, 514. Skin 510 is formed to include a seat 513 extending into passageway 518 from side wall 516 adjacent to upper end 512 and a pair of slots 522, 523 that divide side wall 516 into opposite halves 530, 532. Slots 522, 523 are positioned to lie in general alignment with one another and are in alignment with side walls 22, 23 of fuel tank 12, in a manner similar to slots 222, 223 as shown in FIGS. 1 and 4. Slots 522, 523 in baffle 532 also eliminate the effect of the downwardly extending skirt 510 on the predetermined fuel fill level within fuel tank 12. Skirt 511 acts to route the flow of liquid fuel 13 around baffle 510 and away from a valve container (not shown) coupled thereto in a manner similar to baffle 34.

Figure 13:
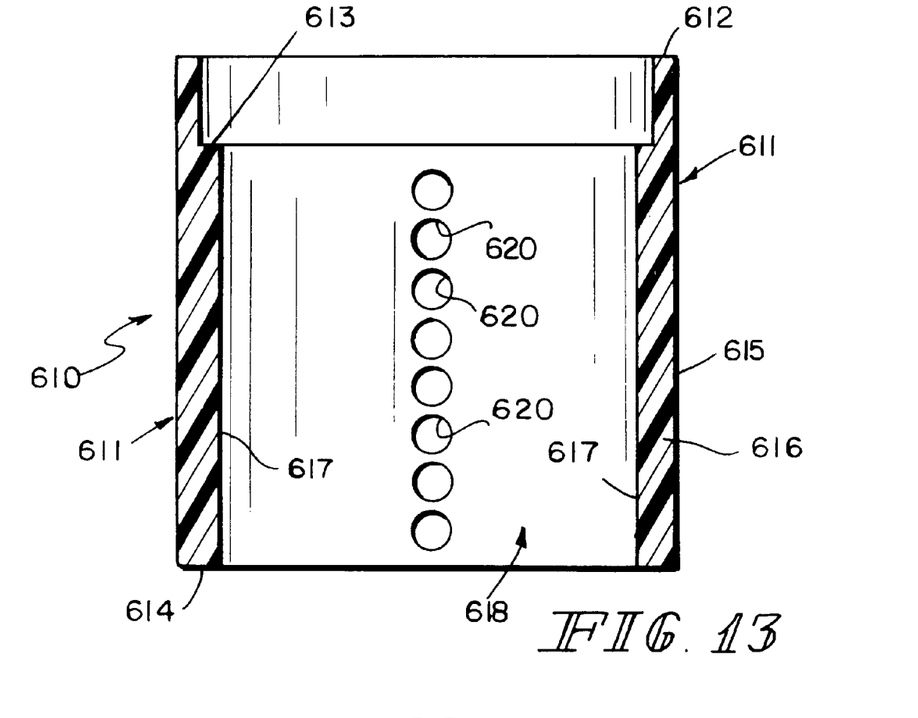
FIG. 13 is a cross-sectional view of an alternative embodiment of the baffle in accordance with the resent invention, showing the baffle including a skirt defining a passageway, a seat extending into the passageway, and apertures formed through the skirt.
Figure 14:
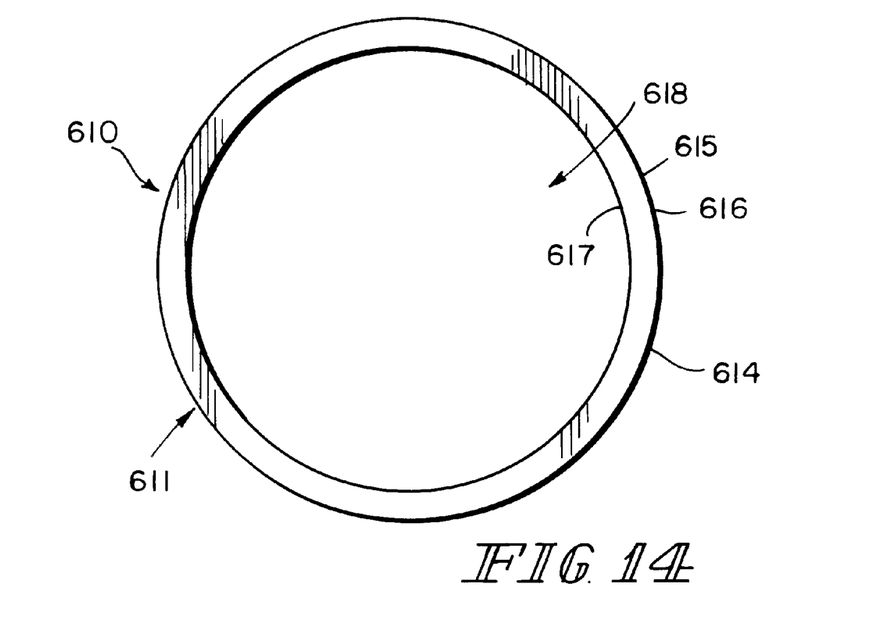
FIG. 14 is a bottom view of the baffle of FIG. 11.

In still another embodiment of the present invention a baffle 610 is provided. As shown in FIG. 13, baffle 610 includes a skirt 611 having an upper end 612 formed to snap-fit on inlet 36 of housing 34, a lower end 614, and a side wall 616. As best shown in FIG. 14, side wall 616 includes an exterior surface 615 and an interior surface 617. Interior surface 617 defines a passageway 618 extending between upper and lower ends 612, 614. Skirt 610 is formed to include a seat 613 extending into passageway 618 from side wall 616 adjacent to upper end 612 and apertures 620 that are positioned to lie in general alignment with side walls 22, 23 of fuel tank 12, in a manner similar to slots 222, 223 as shown in FIGS. 1 and 4. Apertures 620 in baffle 632 also eliminate the effect of the downwardly extending skirt 611 on the predetermined fuel fill level within fuel tank 12. Skirt 611 acts to route the flow of liquid fuel 13 around baffle 610 and away from a valve container (not shown) coupled thereto in a manner similar to baffle 34.

Liquid fuel baffle slows the flow of liquid fuel 13 into the valve container of the vent apparatus to give the valve within the valve container time to react liquid fuel 13 in fuel tank 12. Thus, the valve closes itself when necessary and premature closure of the vent apparatus is prevented. It is within the scope of this disclosure to couple liquid fuel baffles 32, 334, 510, and 610 to any number of vent apparatuses mounted in fuel tank 13.

Although the invention has been described in detail with reference to a preferred embodiment, variations and modifications exist within the scope and spirit of the invention as described and defined in the following claims and defined in the following claims.

What is claimed is:

1. An apparatus for controlling discharge of fuel vapor from a vehicle fuel tank through an aperture in the top wall thereof, the apparatus comprising a valve container adapted to be mounted in a top wall of the fuel tank, the valve container being formed to include a vapor inlet adapted for communicating with an interior region of the fuel tank, and a vapor outlet, a first float valve disposed in the valve container and movable between an opened position allowing flow of fuel vapor through the vapor outlet and a closed position preventing flow of fuel vapor through the vapor outlet, a baffle including an upper end coupled to the vapor inlet, a lower end spaced-apart from the upper end, and a skirt extending between the upper and lower ends, the skirt including a vertical extending slot therethrough, which slot extends to a bottom of the baffle, and a second float valve disposed in the valve container between the first float valve and the slot of the baffle.

2. The apparatus of claim 1, wherein the skirt is formed to define a passageway extending between the upper and lower ends.

3. The apparatus of claim 2, wherein the skirt of the baffle includes a seat extending into the passageway and the seat engages the vapor inlet of the valve container.

4. The apparatus of claim 3, wherein the skirt of the baffle is generally cylindrical in shape and includes opposite exterior surfaces.

5. The apparatus of claim 1, wherein the baffle is formed integrally with the valve container.

6. The apparatus of claim 5, wherein the skirt of the baffle includes a passageway extending between the upper and lower ends and a lower lip extending into the passageway and the valve container includes a floor supported on the lower lip.

7. The apparatus of claim 6, wherein the floor includes an aperture therethrough and the second float valve normally engages the floor.

8. The apparatus of claim 7, wherein the baffle includes spaced-apart slots.

9. The apparatus of claim 1, wherein the baffle is formed to include two slots positioned to lie in a spaced-apart relationship relative to one another.

10. An apparatus for controlling discharge of fuel vapor from a vehicle fuel tank through an aperture in the top wall thereof, the apparatus comprising a valve container adapted to be mounted in a top wall of the fuel tank, the valve container being formed to include a vapor inlet adapted for communicating with an interior region of the fuel tank, and a vapor outlet, the vapor inlet including a lower rim, a float valve disposed in the valve container and movable between an opened position allowing flow of fuel vapor through the vapor outlet and a closed position preventing flow of fuel vapor through the vapor outlet, and a baffle including an upper end coupled to the vapor inlet, a flange extending from the upper end for engagement with the lower rim of the valve container, an open lower end spaced-apart from the upper end, a skirt extending between the upper end and the open lower end, the skirt including spaced-apart vertically extending slots therethrough and being formed to define a passageway extending between the upper and lower ends, and a seat extending from the skirt into the passageway, the seat engaging the vapor inlet of the valve container.

11. The apparatus of claim 10, wherein the seat includes an aperture therethrough.

12. An apparatus for controlling discharge of fuel vapor from a vehicle fuel tank through an aperture in the top wall thereof, the apparatus comprising a valve container adapted to be mounted in a top wall of the fuel tank, the valve container being formed to include a vapor inlet adapted for communicating with an interior region of the fuel tank, and a vapor outlet, the vapor inlet including a lower rim, a float valve disposed in the valve container and movable between an opened position allowing flow of fuel vapor through the vapor outlet and a closed position preventing flow of fuel vapor through the vapor outlet, and a baffle including an upper end coupled to the vapor inlet, a flange extending from the upper end for engagement with the lower rim of the valve container, a lower end spaced-apart from the upper end, a skirt extending between the upper and lower ends, the skirt including spaced-apart slots therethrough and being formed to define a passageway extending between the upper and lower ends, and a seat extending from the skirt into the passageway, the seat engaging the vapor inlet of the valve container, and the slots extend from the lower end toward the seat.

13. The apparatus of claim 12, wherein each of the slots has a pre-determined width of about 0.75 inches to about one inch.

14. An apparatus for controlling discharge of fuel vapor from a vehicle fuel tank through an aperture in the top wall thereof, the apparatus comprising a valve container adapted to be mounted in a top wall of the fuel tank, the valve container being formed to include a vapor inlet adapted for communicating with an interior region of the fuel tank, and a vapor outlet, the vapor inlet including a lower rim, a float valve disposed in the valve container and movable between an opened position allowing flow of fuel vapor through the vapor outlet and a closed position preventing flow of fuel vapor through the vapor outlet, and a baffle including an upper end coupled to the vapor inlet, a flange extending from the upper end for engagement with the lower rim of the valve container, a lower end spaced-apart from the upper end, a skirt extending between the upper and lower ends, the skirt including spaced-apart slots therethrough and being formed to define a passageway extending between the upper and lower ends, and a seat extending from the skirt into the passageway, the seat engaging the vapor inlet of the valve container, and the seat includes an aperture therethrough and the seat supports the float valve in the valve container.

15. A fuel tank apparatus comprising a fuel tank including a top and bottom walls, side walls, and end walls cooperating to define an interior region, a valve container mounted in the top wall of the fuel tank, the valve container being formed to include a vapor inlet communicating with the interior region of the fuel tank and a vapor outlet, a first float valve disposed in the valve container and movable between an opened position allowing flow of fuel vapor through the vapor outlet and a closed position preventing flow of fuel vapor through the vapor outlet, a baffle coupled to the vapor inlet of the valve container, the baffle including an exterior surface, an opposite interior surface defining a passageway formed to conduct fuel vapor from the interior region of the fuel tank to the vapor inlet opening, and vertically extending slots extending between the exterior and interior surfaces and to a bottom of the baffle, the slots being in alignment with the side walls of the fuel tank, and a second float valve disposed in the valve container between the first float valve and the baffle.

16. The apparatus of claim 15, wherein the baffle includes a seat extending from the interior surface into the passageway and the seat engages the inlet of the valve container.

17. The apparatus of claim 16, wherein the baffle includes an upper end coupled to the valve container and a lower end and the slots extend from the lower end toward the seat.

18. The apparatus of claim 16, wherein the seat includes an aperture therethrough.

19. The apparatus of claim 15, wherein the baffle is formed integrally with the valve container.

20. The apparatus of claim 19, wherein the baffle includes a lower lip extending from the interior surface into the passageway and the valve container includes a floor supported on the lower lip.

21. An apparatus for controlling discharge of fuel vapor from a vehicle fuel tank through an aperture in the top wall thereof, the apparatus comprising a valve container adapted to be mounted in a top wall of the fuel tank, the valve container being formed to include a vapor inlet adapted for communicating with an interior region of the fuel tank and a vapor outlet, a baffle including an upper end coupled to the vapor inlet, an open lower end spaced-apart from the upper end, and a skirt extending between the upper and lower ends, the skirt including at least one slot therethrough, and a float valve disposed in the valve container and movable between an opened position allowing flow of fuel vapor through the vapor outlet and a closed position preventing flow of fuel vapor through the vapor outlet, and the float valve being positioned to lie between the vapor inlet and the slot of the baffle when in both the opened and closed positions.

22. The apparatus of claim 21, wherein the baffle is formed integrally with the valve container.

23. The apparatus of claim 21, wherein the baffle includes two slots.

24. The apparatus of claim 23, wherein the slots extend from the lower end toward the upper end.

* * * * *